May 19, 1959 — H. H. TALBOYS — 2,887,066
METHOD AND MACHINE FOR TAMPING RAILWAY BALLAST
Filed Dec. 23, 1955 — 9 Sheets-Sheet 1

Inventor
Henry H. Talboys
by Parker & Carter
Attorneys

May 19, 1959     H. H. TALBOYS     2,887,066
METHOD AND MACHINE FOR TAMPING RAILWAY BALLAST
Filed Dec. 23, 1955     9 Sheets-Sheet 7

Inventor
Henry H. Talboys
by Parker & Carter
Attorneys

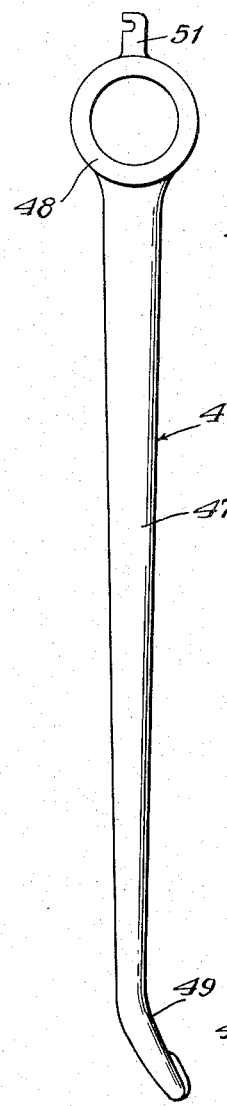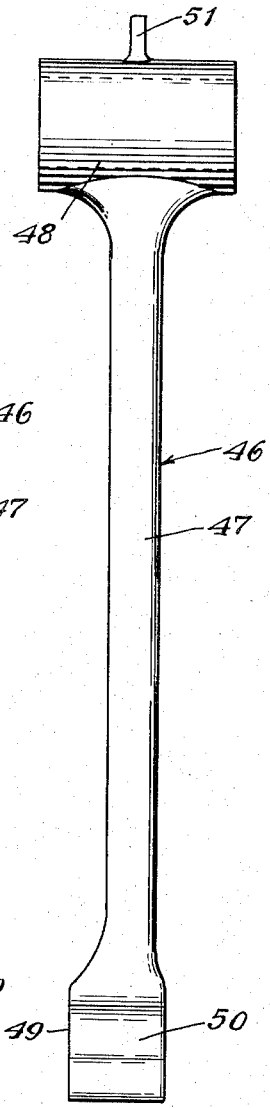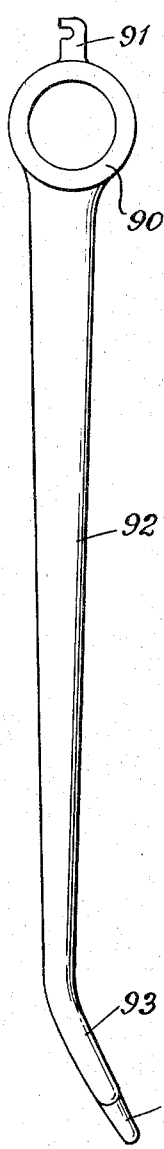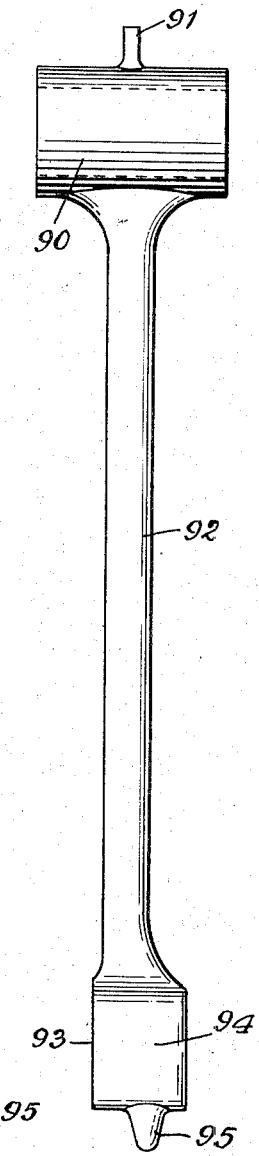

May 19, 1959     H. H. TALBOYS     2,887,066
METHOD AND MACHINE FOR TAMPING RAILWAY BALLAST
Filed Dec. 23, 1955     9 Sheets-Sheet 9

Inventor
Henry H. Talboys
by Parker & Carter
Attorneys

United States Patent Office 2,887,066
Patented May 19, 1959

2,887,066

METHOD AND MACHINE FOR TAMPING RAILWAY BALLAST

Henry H. Talboys, Milwaukee, Wis., assignor to Nordberg Manufacturing Company, Milwaukee, Wis., a corporation of Wisconsin Application December 23, 1955, Serial No. 555,068

13 Claims. (Cl. 104—12)

The present invention is directed to a new and improved ballast tamping method and machine. A major purpose of the present invention is the provision of an improved ballast tamping machine which is relatively light-weight, is extremely versatile in use, and which can be operated simply in carrying out the improved methods of the present invention.

Another purpose is the provision of an improved method and machine for tamping ballast which gives good quality of tamping over a wide range of desired track lifts and which are effective in all types of ballast whether light ballast such as gravel, or relatively heavy ballast such as stone.

Another purpose is the provision of an improved ballast tamping machine with an improved frame construction and weight distribution.

Another purpose is the provision of an improved method and apparatus for tamping ballast, which in use are highly effective in tamping the area beneath the rails of a track.

Another purpose is the provision of an improved method and apparatus for tamping ballast which is effective in "spot surfacing" work.

Another purpose is the provision of an improved ballast tamping machine with a minimum of working parts and which uses a mechanical vibrating assembly for tamping ballast.

Another purpose is the provision of an improved ballast tamping machine which is quickly and selectively adjusted for avoidance of any "humping" of the track and which at the same time can be quickly and selectively adjusted for a slight "humping" if considered necessary.

Another purpose is the provision of an improved ballast tamping machine which is effective with "skewed" ties.

Another purpose is the provision of an improved mounting system for a ballast tamping drophead and arrangement of vibrating elements carried thereby in a railroad ballast tamping machine.

Another purpose is the provision of a novel supporting drophead for ballast tamping implements.

Another purpose is the provision of a novel combination of vibratory implements or tamping bars and supporting structure therefor which produces interweaving of the ballast particles in order to firmly pack the supporting bed of ballast beneath the ties and rails of a track.

Another purpose is the provision of a novel suspension system for ballast tamping implements of the vibratory type which not only minimizes the transmission of vibratory forces to the supporting frame for the implements, but at the same time brings about a new motion in the tamping implements.

Another purpose is the provision of a new vibrating mechanism for ballast tamping machines.

Other purposes will appear from time to time in the course of the ensuing specification and claims.

Referring generally now to the drawings:

Figure 8 is a side view of one form of ballast tamping implement utilized in the invention;

Figure 9 is a front view of the implement shown in Figure 8;

Figure 10 is a side view of another form of ballast tamping implement which forms part of the present invention;

Figure 11 is a front view of the implement illustrated in Figure 10; and

Like elements are designated by like characters throughout the specification and drawings.

Figure 1:
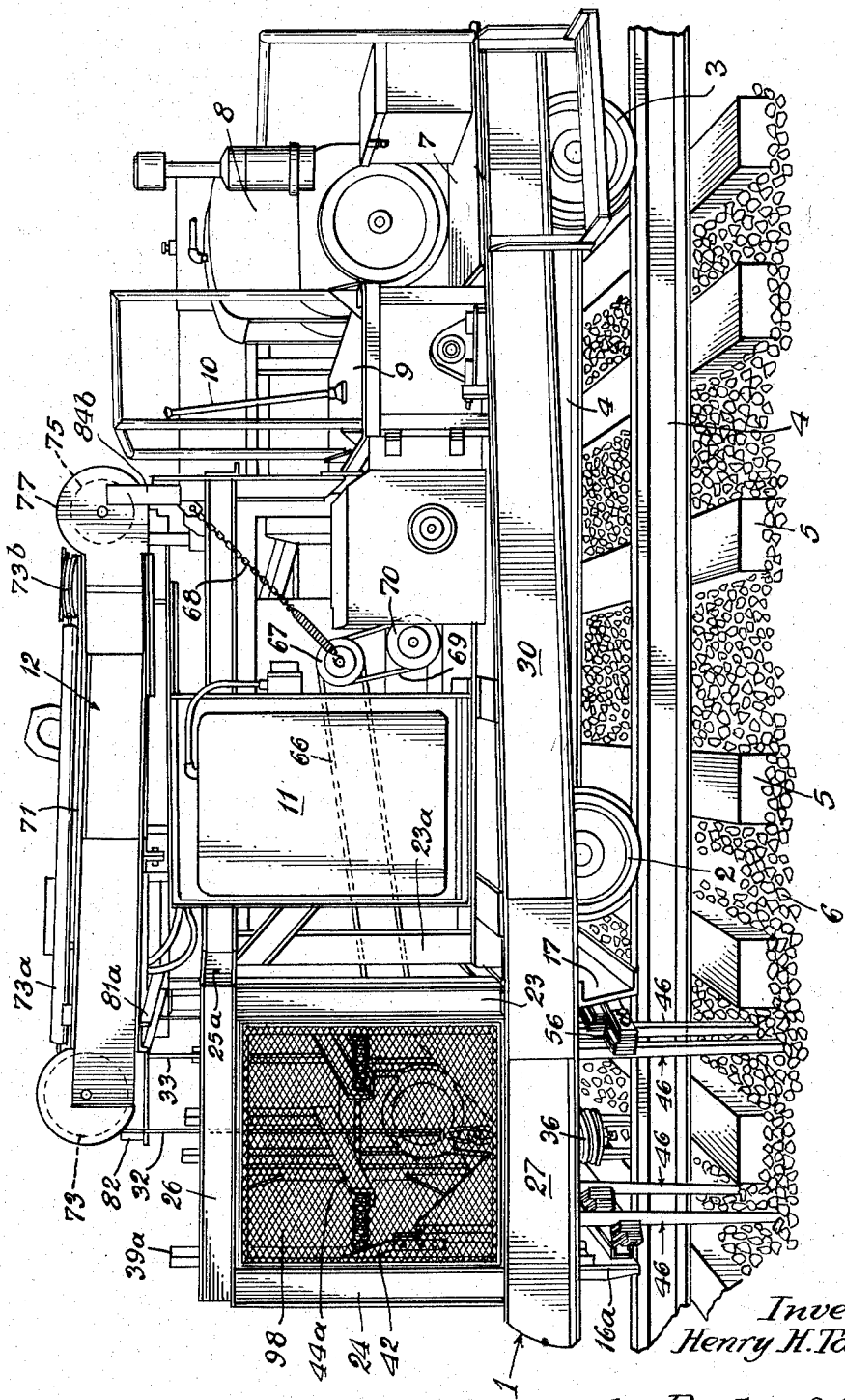
Figure 1 is a side view, in elevation, of the improved ballast tamping machine forming the present invention.

Referring specifically now to the drawings and in the first instance to Figure 1, 1 designates the ballast tamping frame which is supported on front and rear wheel assemblies 2 and 3 respectively, and which is adapted for movement over track rails 4. The rails are supported on ties 5 which are positioned in the customary ballast bed 6.

The main frame 1 supports a prime mover 8 in the form of an internal combustion engine at the rear of the machine. A traveling control stand 9 is positioned generally centrally of the main frame and forwardly of the prime mover 8. It should be understood that the prime mover 8 will be employed to drive either the front wheels 2 or rear wheels 3 or both through any suitable transmission mechanism (not shown) and under control of the operator by any suitable transmission control which is represented more or less diagrammatically by the shift lever 10 on the traveling control stand. Represented at 11 is an electrical control panel for various hydraulic elements of the machine and which may serve to operate these elements in a selective manner to be more fully explained in ensuing portions of this specification.

Figure 2:
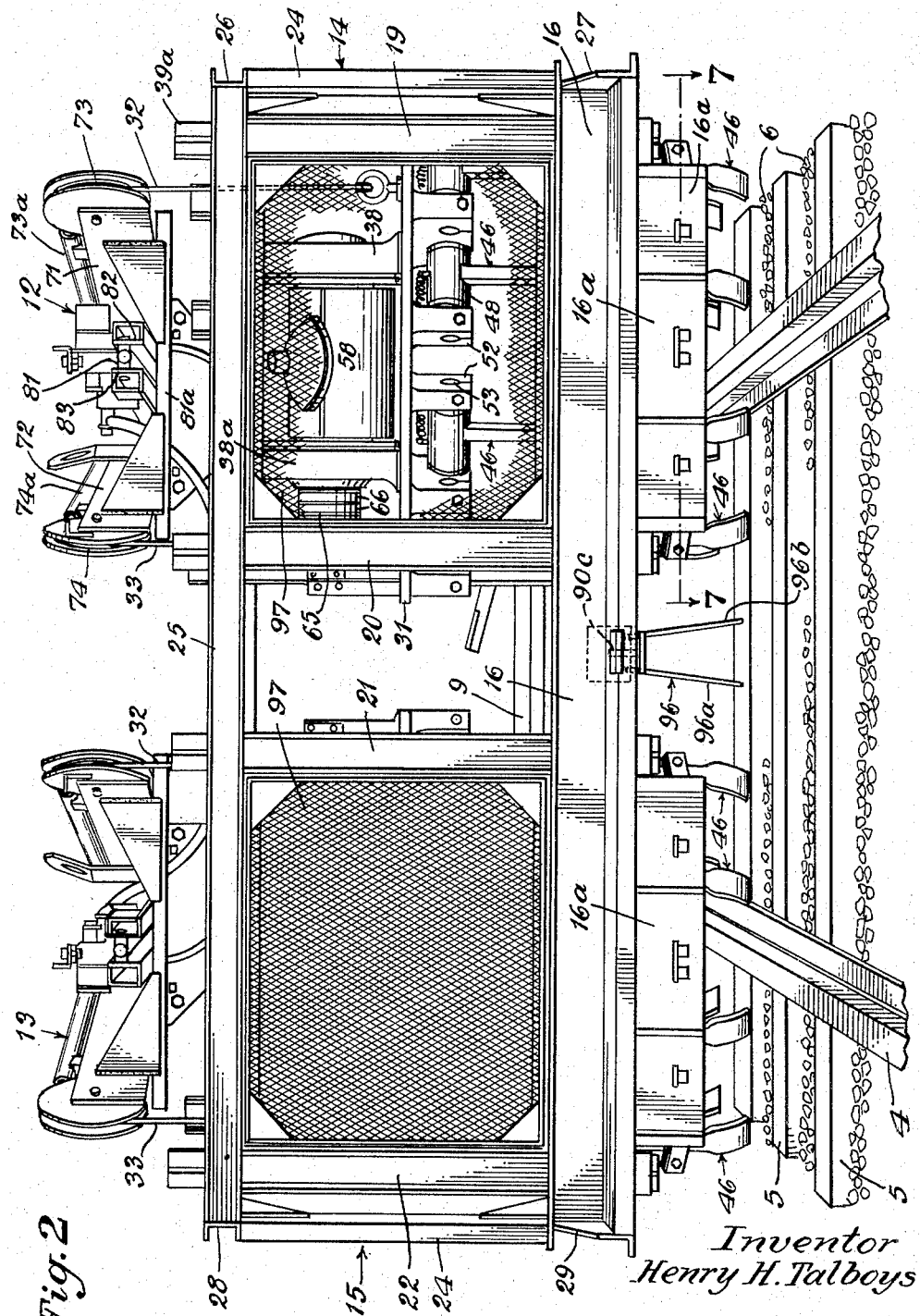
Figure 2 is an end view, in elevation, of the machine.

In Figures 1 and 2, hoisting assemblies are formed on an upper and forward position of the frame and shown generally at 12 and 13. As will be best seen in Figure 2, a hoisting assembly is positioned at each side of the machine at a position generally above each of the rails of the track. The right-hand hoist assembly is designated at 13 in Figure 2.

As will be clear, for example, from Figure 2, I provide a drophead aligned over each rail of the track. The dropheads or tamping heads, each having a gang of tamping implements movably mounted on it, are positioned at each side of the main frame and forwardly of the front wheels 2. One such head is positioned above each rail of the track. In Figure 2 the left-hand drophead, which will later be described in greater detail, is shown at the right side of the picture, whereas the right-hand drophead is concealed by the mesh 97. For each drophead I provide a guide structure, generally indicated in Figure 2 as 14 and 15. These guide structures include, for example, front and rear lower beams or frame elements 16 and 17 which are generally parallel and extend transversely of the track. These cross members 16 and 17 are suitably secured to the longitudinally extending main frame 1. Vertical guideways for the dropheads are formed by upstanding frame members 19, 20, 21 and 22, as will appear in Figure 2. Other vertical frame members are indicated at 23 and 24. An upper cross frame member 25 extends above and in parallelism with the beam 16 and is secured to upstanding frame members 19, 20, 23 and 24.

Figure 5:
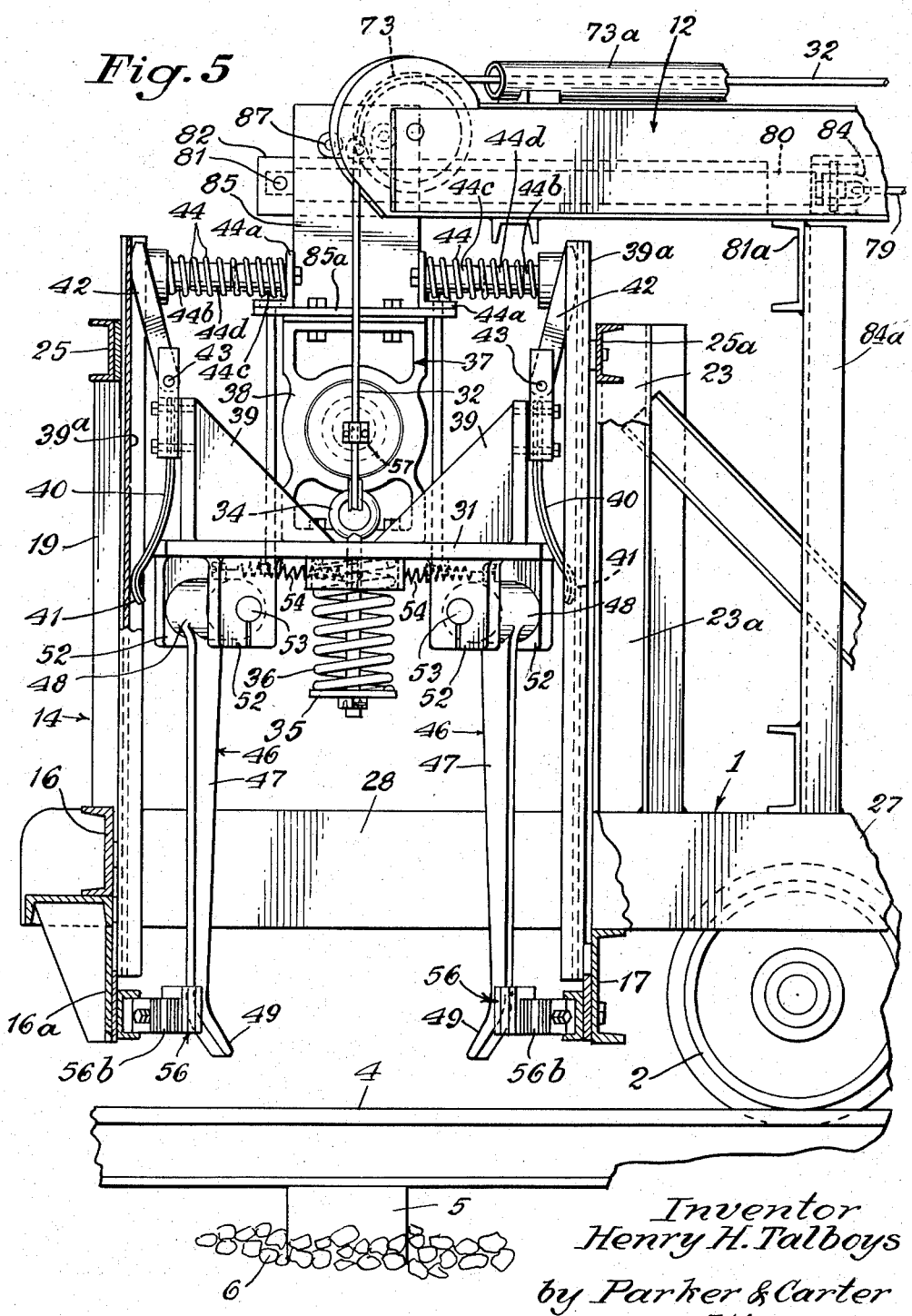
Figure 5 is a side view, in section, of a portion of the machine illustrated in Figure 1.

An upper beam 25a is positioned above beam 17 in general parallelism thereto and is joined to the rearward upstanding elements 23 and 23a shown in Figure 5. Upper and lower longitudinally extending frame members 26 and 27 are joined to the outer ends of the members 25, 25a and 16, 17 at one side. Similar upper and lower frame elements 28 and 29 are joined to the other ends of the members 25, 25a and 16, 17 on the other side of the machine. It will be understood that the details of the frame are not critical, and they are shown primarily for illustration.

The outboard sides of the framework thus formed are positioned considerably outwardly of the rails. I find it important to employ rearwardly converging frame elements 30 which are extensions of the beams in Figure 1. These rearwardly converging frame elements extend from a point on the rear of the machine where they are affixed to the frame and are bent at the junction of the frame member 27 with the upstanding member 23. Although only one such converging element appears in Figure 1, it should be understood that a similar frame member or element is employed on the other side of the machine.

Both the right-hand head and left-hand head appearing in Figure 2 are thus provided with identical guiding structures. The remaining portion of each head is identical and for this reason only the structure of the left-hand head will be described in detail.

Figure 4:
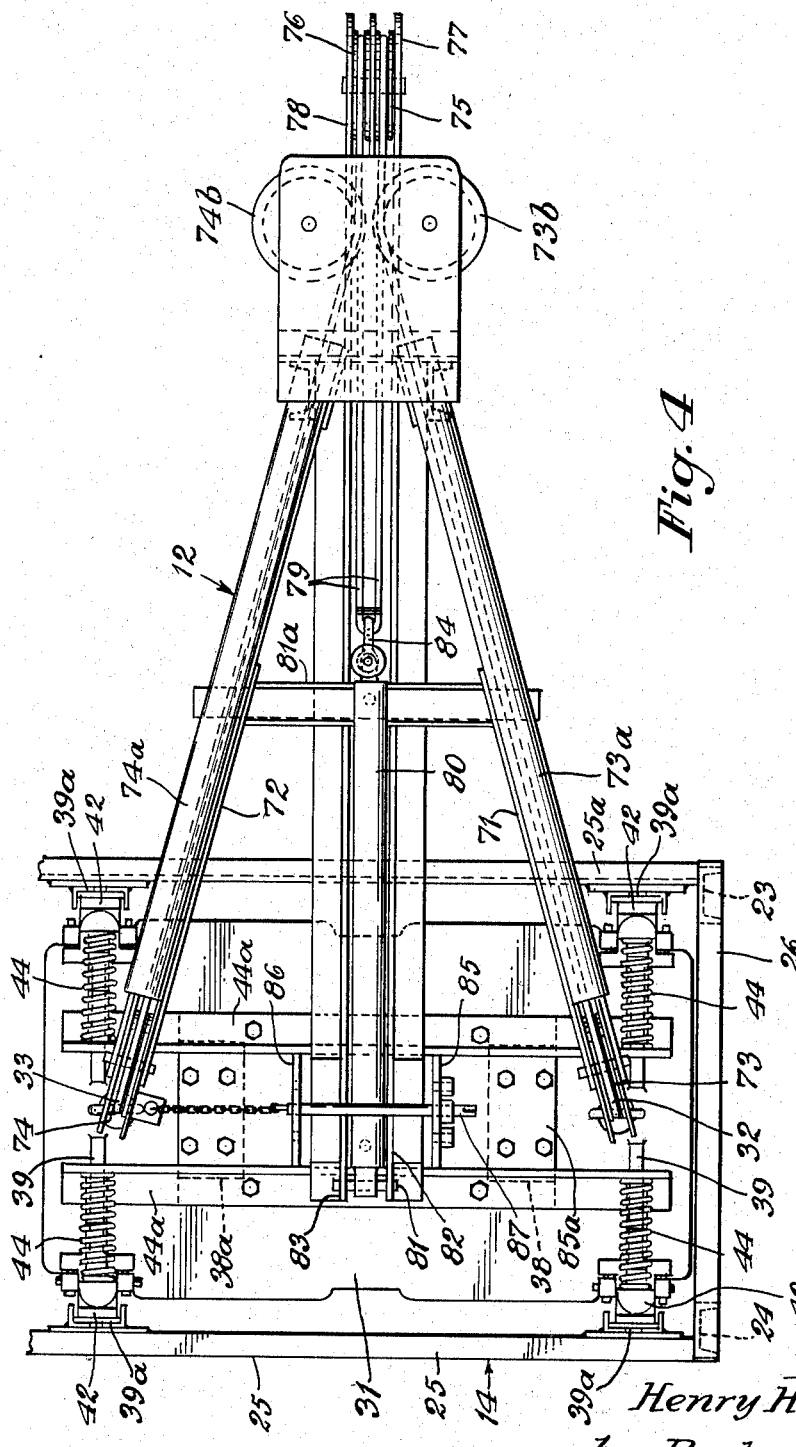
Figure 4 is a plan view of a portion of the machine illustrated in Figure 1.
Figure 6:
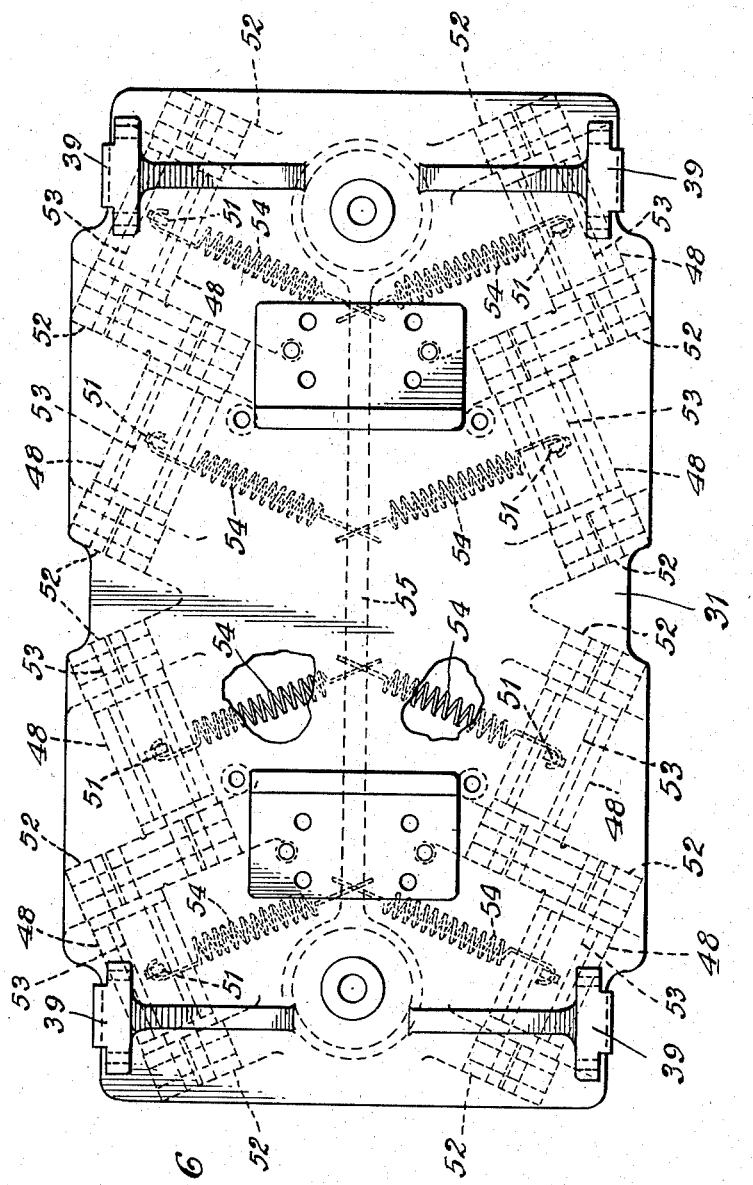
Figure 6 is a plan view of one of the implement carrying dropheads utilized in the invention.
Figure 7:
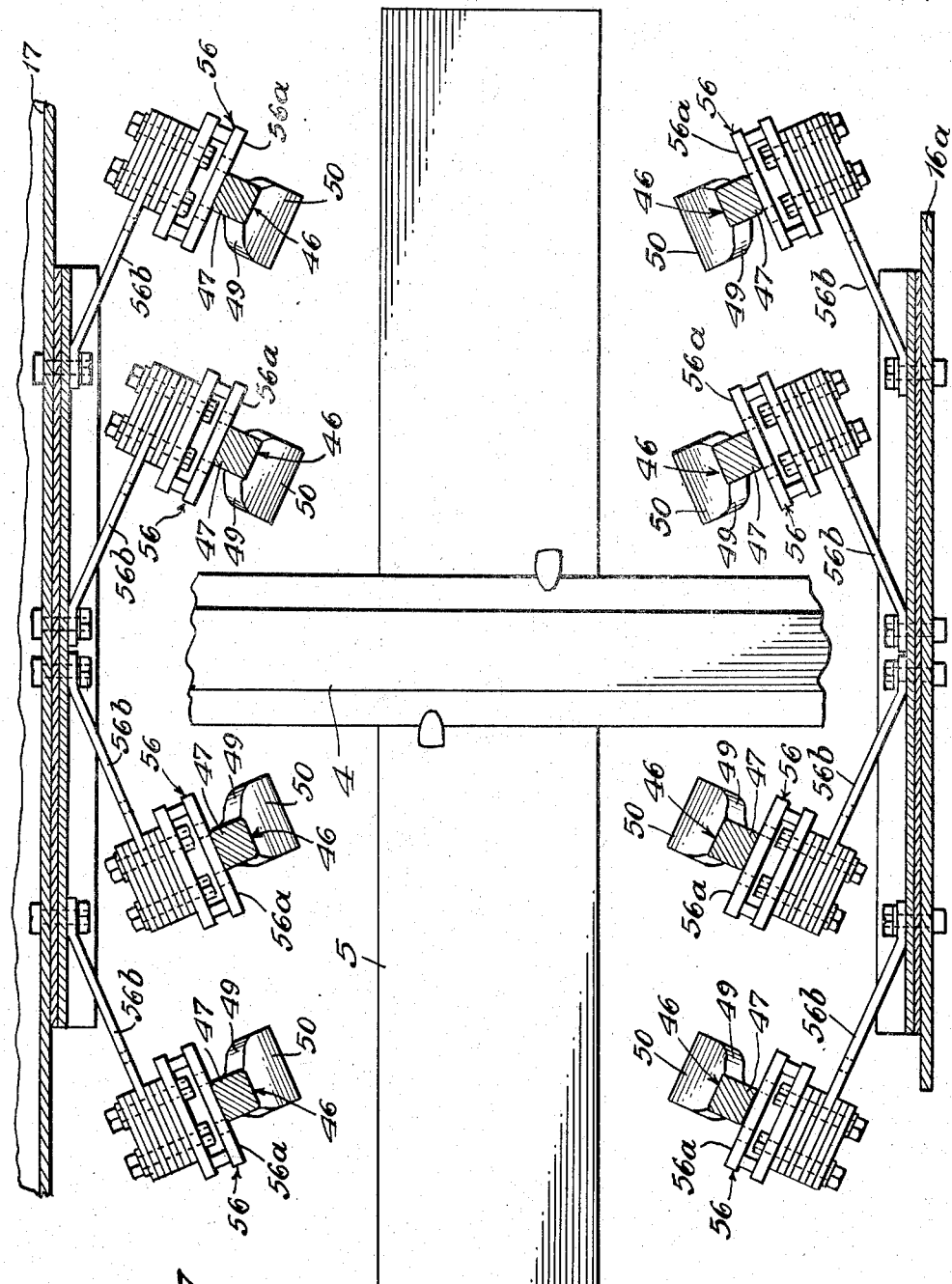
Figure 7 is a sectional view of the ballast tamping implements and guiding structure therefor looking in the direction of the arrows 7—7 of Figure 2.

Each head includes drophead 31 which is substantially rectangular in plan view as will appear best in Figure 6. The drophead is suspended within the guiding structure by means of cables 32 and 33 (Figure 4). The cables are secured to bolts 34 which extend through the drophead and carry a spring abutment 35 at their lower end. Compression springs 36 are interposed between the abutments 35 and the undersurface of the drophead 31. Thus the drophead is capable of vertical play against the springs 36. By raising and lowering the cables 32 and 33 simultaneously, the drophead will be raised and lowered.

A mechanical vibratory mechanism 37 is positioned on the upper surface of the drophead between the cables 32 and 33 and is mounted on upstanding members shown generally at 38 and 38a, Figure 4.

According to the invention, each of the dropheads is mounted for what I term "floating" movement at any position of elevation within its associated guide structure. By the term "floating" I mean that the drophead is capable of limited movement in a vertical direction as well as in a longitudinal direction (considered generally parallel to the rails).

Guiding channels 39a are adjacent to the upstanding members 19, 20, 21 and 22 and appear best in Figure 4 and Figure 5. Upstanding supports 39 are formed generally at each corner of the drophead. A downwardly extending leaf spring element 40 is joined to each of the supports and includes a depending end portion 41 extending outwardly from the drophead and which bears against each guide 39a. Each upstanding member 39 also supports an upwardly extending link 42 which is pivoted at its lower end at 43 to the support. Each link 42, at its upper end, is biased into engagement with the guide track by a compression spring 44 which extends between a channel 44a overlying and joined to the supports 38 and 38a and the upper end of the link 42. The springs 44 surround generally cylindrical abutments 44b and 44c which are joined to the links 42 and the channel 44a, respectively. A compressible insert 44d, of rubber-like material, is interposed between the abutments 44b and 44c. It serves to limit movement of the abutments toward one another, and to take up shock, and prevents the coil springs from setting up periodic vibrations. The bias provided by the springs at each corner of drophead 31 tends to maintain the drophead centered within the guiding structure. The drophead may move rearwardly by compressing the rearward springs 40 and 44 and can move forwardly with relation to the upstanding members by compressing the forward spring elements 40 and 44. In addition, the drophead may rock about a generally horizontal axis extending transversely of the machine. Furthermore, the drophead may rotate slightly against the action of the springs and about a generally vertical axis.

Figure 3:
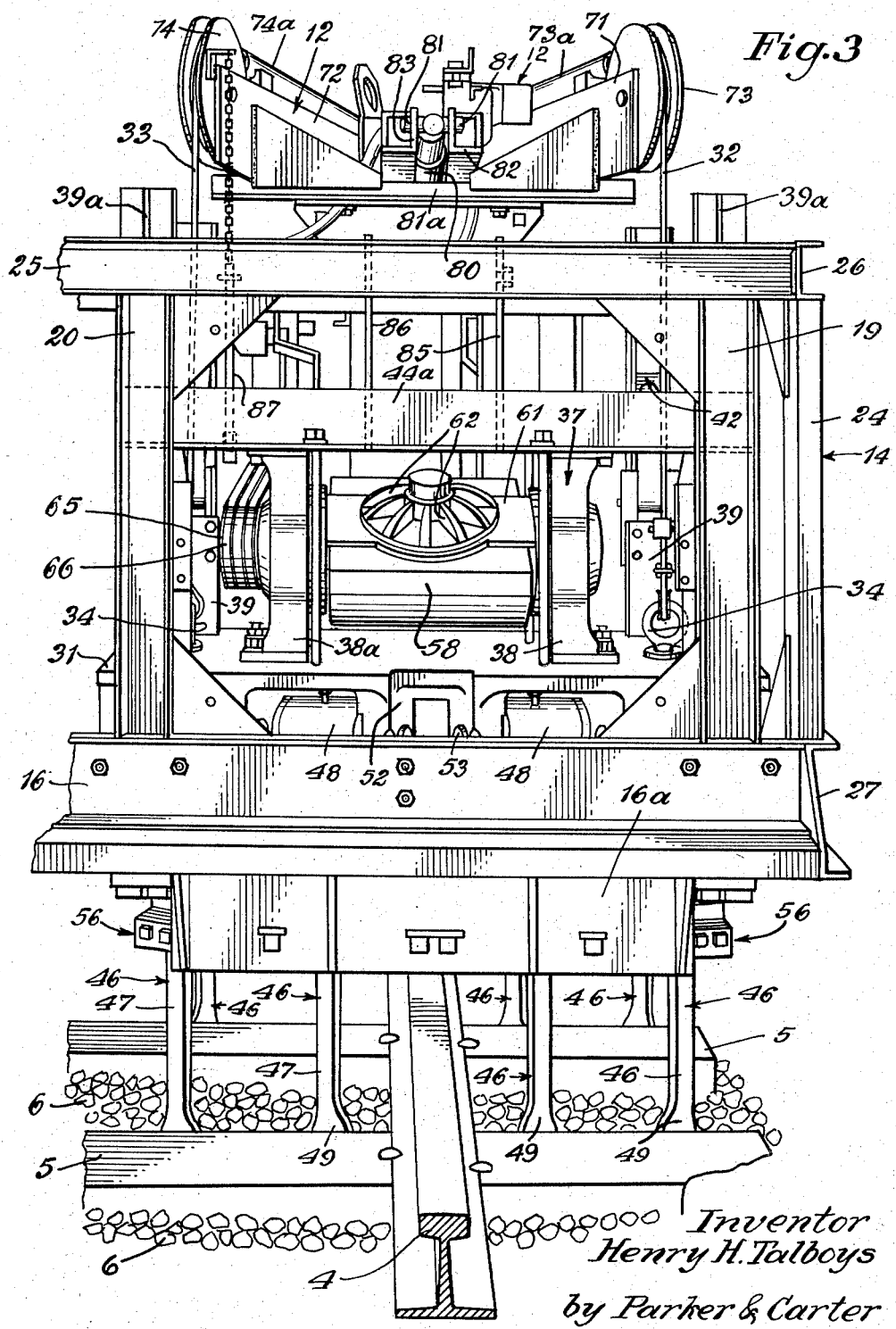
Figure 3 is an end elevation view of a portion of the machine shown in Figure 2, with parts being broken away for purposes of clarity, and illustrating another operative position of the elements of the machine.

Each of the dropheads supports a plurality of ballast working implements or tamping bars which are arranged to enter the ballast bed, upon downward movement of the drophead, on opposite sides of the supporting tie and on opposite sides of the rail as will appear most clearly in Figure 3. Each of the tamping bars which I designate at 46 includes a generally elongated body 47. The body 47 terminates in a bearing hub 48 at the upper end of the body. The body has a progressively reduced cross-section from the hub 48 to a lower end portion 49. The portion 49 is inclined to the axis of the body. The spade-like portion 49 includes a flat face 50 which has a greater width than the body and which contacts the ballast upon swinging movement of the implement about the axis of the bearing hub 48. A spring retaining projection is formed above the bearing hub 48 and is shown at 51. Each of the implements or tamping tools is preferably pivotally mounted on the lower surface of the drophead as by means of depending brackets 52 which are formed on the lower surface of the drophead and in which pivot pins 53 are positioned.

In Figure 6 it will be noted that there are eight such brackets with pivot pins for supporting a gang of eight implements 46. The pivot axes are generally parallel to the lower surface of the drophead. Each pivot axis is inclined to the longitudinal axis of the rails and also inclined to the longitudinal axis of the ties. The pair of pivot axes in each quadrant section of the drophead are generally parallel to one another and are also generally parallel to the pair of axes in the diagonally opposite quadrant. They are positioned so that a pair of implements will enter into the supporting ballast, upon descent of the drophead on each side of the supporting tie as well as on each side of the rail. Thus the tamping tools will enter and tamp the ballast area below the zone of contact of rail with tie. Springs 54 are connected to a depending and generally transversely extending rib 55 and to the upstanding projection 51. The springs 54 serve to bias the implements away from the supporting rail and away from the tie.

Positioned for example on the frame members 16a and 17 are a plurality of guides or tamper bar abutments 56. An abutment is aligned beneath each bracket on the drophead. Each of the abutments 56 has a generally flat guiding surface 56a which is positioned to be contacted by the implements or tamper bars 46 during their descent into the supporting ballast. Each guiding surface lies in a plane generally parallel to the pivot axis of the tamping bar or implement associated with the guide. Each guide 56 is carried by an arm 56b which is affixed to the frame of the machine. The guides for the bars on the rearward portion of the drophead are shown as supported on the frame member 17 whereas the guides for the bars on the forward portion of the drophead may be supported on a frame portion 16a which extends below the frame member 16. The guides 56 also limit outward movement of the bars about their pivot axis and away from the tie (such movement being brought about by the springs 54).

Figure 12:
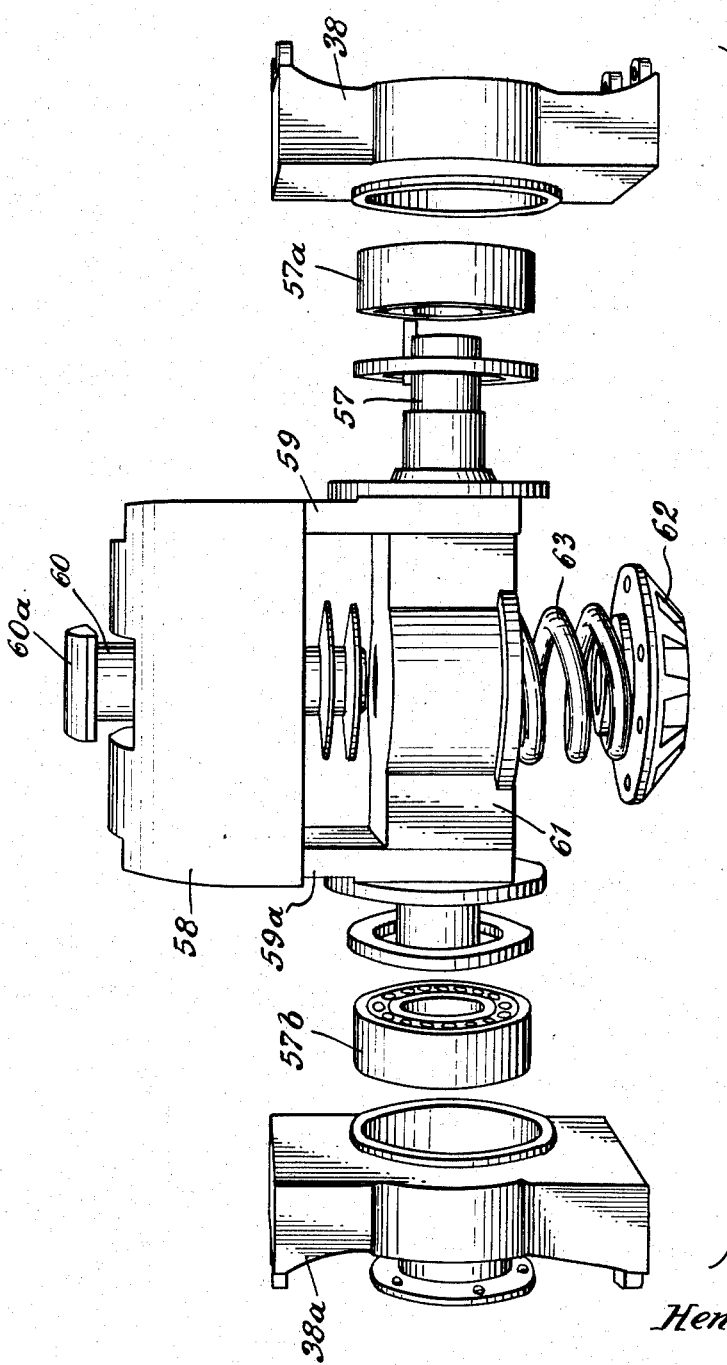
Figure 12 is an exploded view of a vibratory mechanism employed in the invention.

Each of the vibrating mechanisms, as will be seen most clearly in Figure 12, includes a shaft 57 which is journaled for rotation in bearings 57a and 57b. The bearings 57a and 57b are insertable in the upstanding members 38 and 38a. A weight 58 is slidably mounted on arms 59 and 59a which are fixed to the shaft 57 and extend outwardly therefrom. A bolt 60 extends through the weight 58 and through a central portion 61 of the shaft. The head 60a of the bolt bears against a portion of the weight 58. A nut 62 is adapted to be threaded on to the bolt on the other side of the central portion from the weight 58. A spring 63 extends between the nut 62 and the central portion 61. The spring 63 has the strength to hold the bolt 60 and the weight 58 inwardly with relation to the shaft 57. During rotation of the shaft 57 at slow speeds, the strength of the spring 63 is sufficient to maintain the eccentric weight 58 in an inwardly withdrawn position. As the speed of rotation is increased, however, centrifugal force will move the weight 58 outwardly with relation to the central portion 61, against the bias of the spring 63. By adjusting the nut 62 with relation to the bolt 60 the extent of outward movement of the weight 58 can be controlled and thus the amplitude of vibration due to the rotation of the eccentric weight 58 can be closely controlled. This is important in connection with working in various types of ballast as will later appear.

The upstanding members 38 and 38a may be bolted to the upper surface of the drophead 31.

I employ a flexible transmission for rotating each of the vibrating mechanisms. I illustrate, for example, a pulley 65 which is fixed to the shaft 57 outside of the upstanding support 38a. A belt or belts 66 is passed around this pulley and extends rearwardly to an idler pulley assembly 67 (Figure 1) which is resiliently suspended from the frame as by means of the spring 68. The spring 68 extends upwardly and rearwardly from the pulley 67. The idler pulley assembly 67 is driven by a belt 69 which is passed about a pulley 70 journaled for rotation in the frame at a point below the pulley 67. It should be understood that a suitable transmission (not shown herein) will be employed to drive the pulley 70 from the engine 8 under control of the operator. The idler pulley assembly 67 and spring 68 maintain a driving tension on the belt 66 at all elevated positions of the drophead.

Each of the hoisting assemblies are identically formed and for this reason only the right-hand assembly appearing in Figures 2 and 4 will be described. Each assembly includes forwardly diverging frame members 71 and 72 which support, at their outer ends, pulleys 73 and 74. The supporting cables 32 and 33 are passed upwardly about the pulleys 73 and 74 and are then taken rearwardly through guide cylinders 73a and 74a fixed to the members 71 and 72. The cables are then passed around idlers 73b and 74b which are rotatable around vertical axes. The cables are then taken over idler pulleys 75 and 76 which are mounted for rotation about horizontal axes in frame elements 77 and 78. The cables 71 and 72 are passed over the pulleys 75 and 76 and are then taken forwardly forming a bight 79. An hydraulic ram 80 is pivoted as at 81 to frame members 82 and 83 which extend upwardly from a frame member 81a joined to the frame members 71 and 72. The piston of the ram is connected at its outer end to a hook or eyelet 84 which is connected to the bight 79. Extension of the piston of the ram in a rearward direction pays out the cable, thus allowing the drophead supported by the cables to descend. Retraction of the piston causes a lifting of the cables 32 and 33. The cables 32 and 33 may be taken in until the drophead is at its uppermost position illustrated at Figure 5. I find it advantageous to absorb the load taken by the hoisting assemblies at a point rearwardly of the forward wheels. Each hoisting assembly is supported by longitudinally and generally vertically extending spaced frame structures. The forward frame structure is shown at 84a in Figure 5 whereas the rearward frame structure appears at 84b in Figure 1.

Spaced upstanding members 85 and 86 (Figure 4) are joined to the upper portion of the members 38 and 38a, as by means of a top plate 85a, and are adapted, in the elevated position of the drophead, to extend above the frame members 82 and 83. In this position of the drophead a rod 87 may be passed through apertures in the upstanding members 85 and 86. Thus the weight of the drophead assembly may be supported by the rod 87 in order to relieve the cables 32 and 33 of strain.

In Figures 10 and 11, I illustrate a variant form of ballast working implement. The implement there shown includes an upper hub 90 which is adapted to be supported by the pivot pin 53. An upwardly extending spring retaining projection or abutment lug 91 is formed above the bearing hub 90. The elongated body 92 of the implement is quite similar to that shown in Figures 8 and 9. With this form of implement or tamping bar, however, the lower end 93 of the implement is inclined outwardly presenting a flat face 94. A digging pick 95 of reduced width with relation to the width of the face 94 is formed on the lowermost portion of the spade-like member 93. The form of tamping bar illustrated in Figures 10 and 11 may be substituted for the tamping bar of Figures 8 and 9 by removing the pivot pins 53 and slipping the hub from between the end portions of the bracket. The bore in the hub 90 is then brought into alignment with the pivot aperture in the bracket and the pivot pin is reinserted.

To help the operator of the machine to correctly "spot" the tamping heads over a tie, the machine is provided with a marker positioned between the tamping heads 14 and 15 and generally intermediate the front and rear frame members 16 and 17. In Figure 2 for example, I illustrate a marker 96 in the form of spaced members 96a and 96b, the lower ends of which are spaced a slight distance above the surface of the ties. The members 96a and 96b may be supported on a longitudinally extending frame member 90c which is joined to the frame members 16 and 17.

Protective screens 97 and 98 may, if desired, be positioned between the forward upstanding members and between the outboard upstanding members.

Whereas I have shown and described an operative form of my invention I wish it to be understood that the showing and description of the invention should be taken as primarily illustrative or diagrammatic. There are many modifications of the invention which will fall within the scope and spirit of the invention and which will be apparent to those skilled in the art. The scope of the invention should be limited only by the scope of the hereinafter appended claims.

The use and operation of my invention are as follows:

I illustrate a ballast tamping machine which is self-propelled and which may be moved from one location to another along the railroad track. The machine has a split tamping head, that is to say, a gang of ballast working implements are positioned over each rail of the track. Thus the ballast bed beneath the entire supporting tie may be tamped by the action of each gang of tampers in unison. On the other hand, when desired, each gang of tampers may be operated individually in accordance with individual track situations or requirements. As will appear clearly in Figure 2, there is a substantial space between the two tamping heads 14 and 15 so that the operator standing on the platform 9 has a clear view of the tie over which each tamping head is positioned. He may clearly see the marker 96 and thus by selective control of the transmission to the wheels of the machine, correctly position the tamping head over the tie, when he is manually controlling the position of the main frame.

The tamping head is preferably located forwardly of the front wheels of the machine. The machine, therefore, always rests on "tamped" track.

In considering a typical sequence of operation, assume that the operator has correctly spotted the tamping head over the tie. In this position, each drophead 31 is poised over a tie with its gang of tamping bars above the ballast bed. The operator then through actuation of suitable controls, not herein shown, causes extension of the ram 80 with the result that the drophead is dropped from the position illustrated generally in Figures 2 and 5 to the position illustrated in Figure 3, where the lower ends of the ballast working implements enter the supporting ballast. During this movement the eccentric weight 58 is rotated at high frequency about the generally horizontal and transversely extending axis of the shaft 57 and the result is the vibration of the substantial mass comprised of the drophead 31, vibrating mechanism and tamping bars. The vibratory movement imparted to the drophead has both a longitudinal component of movement (that is to say, along the rails), and a generally vertical component of movement. The drophead may move upwardly and downwardly and in a longitudinal direction as a result of such vibratory motion. The vibratory movement is imparted directly to the substantial mass formed by the drophead and the vibratory unit and this vibratory movement rocks the base 31, and is transmitted to the tamping bars 46, 47. As the descent of the drophead continues, the lower ends of the tamping implements will move away from the guiding surfaces 56a and inwardly toward the region of the supporting ballast which is directly beneath the supporting tie and the rail, during the rocking action of the bars and base. This is caused by the lower curved ends of the implements exerting a more or less camming action on the implements as it contacts and moves through the ballast. At the same time, the high frequency vertical and longitudinal components of motion are imposed on the upper ends of the tamping bars and this motion is transmitted to the lower ends of the tamping bars. Thus in addition to the downward and inward movement of the tamping bars in the general direction of the region underlying the rail and tie, the lower ends of the tamping bars will have the high frequency, vertical and longitudinal motion imparted thereto in unison. This rocking action assists in producing what I may call an interweaving of the ballast particles. In addition to the vibration longitudinally of the rails, there is also a transverse vibration, across the rails, of the lower ends of the tamper bars, which helps the "interweave" of ballast. At the lowermost position of the drophead, the lower ends of the tamping bars will be beneath the tie. The tamping bars adjacent the rail will have their lower ends relatively close together. The ballast is thus firmly tamped in the region where tamping is most needed or the region beneath both the tie and the rail. The inclination of the axes of connection of the tamper bars to the dropheads directs the compacting action of the bars beneath the rail. After the lapse of a predetermined period of time, say for example from one to five seconds, the ram 80 is retracted, thus elevating the drophead. As the drophead and tamping bars are raised, the springs 54 return the tamping bars to their outer position away from the tie.

In operating the tamper, I prefer to use a predetermined cycle of tamping movements. I may control the descent and elevation of the drophead automatically as by means of the electrical control panel 11 or I may do it manually. Whether controlled electrically or manually, I prefer to set up a cycle whereby the drophead is raised and lowered a predetermined number of times, say for example, three times, with the drophead being lowered and vibrated so as to cause the afore-described action of the tamper bars during each such raising and lowering period.

After this cycle has been completed, the machine may be advanced to the next tie with the dropheads in elevated position, above the next tie to be tamped. This may be accomplished through manual control of the transmission to the driving wheels or may be accomplished automatically by means of suitable electrical control mechanism which may, for example, be responsive to the raising of the drophead at the completion of the cycle.

The impact produced by the fall of the drophead may be varied by varying the maximum height of the drop. This may be accomplished for example by varying the stroke of the ram.

Due to the resilient mount for the drophead, I not only allow the drophead to rock or float against the action of the springs supporting the drophead but I also minimize to a large extent the transmission of vibratory forces to the supporting framework for the machine. The timing sequence is, in practice, important. The tamper is moved step by step along the track. At each station, or at each tie, a uniform, controlled and adjustable sequence of action takes place. The vibration caused by the rotation of the unbalanced counterweight is, in general, in parallelism with the rails, with both a lateral and a vertical component, and also some across-the-rails vibration. The fact that the eccentric has its axis well above the drophead causes the base also to rock or teeter. There is thus a maximum of movement and complexity and variation of movement imparted to the tamper bars.

It should be kept in mind that my invention permits a flexible variation and adjustment of the vibratory and tamping effect. The number of falls per tie or station can be controlled. The degree of impact can be controlled. A full drop may be permitted or the drop of the drophead may be snubbed. The frequency of vibration may be controlled by controlling the rate of rotation of the unbalanced rotor. The amplitude of vibration may be varied by varying or adjusting the eccentricity of the eccentric. The timing of the falls or drops may be controlled and varied. However, for a given length of track, a precisely uniform action is obtainable, and the operator can adjust the tamper for the best action on the ballast of the track length under treatment. Especially the time the tamper bars are vibrating in the ballast can be controlled and made uniform, so that each tie will get the same amount and force of tamping.

The particular vibratory mechanism here employed is relatively simple to maintain and operate. It is easily adjusted for different types of ballast. By simply adjusting the nut 62 with relation to the bolt 60, the amplitude of vibration may be controlled. When working in relatively loose ballast, the eccentricity of the weight 58 may be adjusted to the minimum so as to deliver relatively small vibratory motion to the tamping bars. On the other hand when working in hard or "cemented" ballast, the degree of eccentricity of the weight may be made larger so as to deliver a series of relatively long stroke and high impact blows to the supporting ballast.

Due to the split-head construction of the tamper, the user may operate each gang of tamping bars in unison. Or he may operate only a single gang of tamper bars as when it is necessary to tamp the area beneath only one rail of the track, such as at joints. In practice, I obtain an exceedingly efficient tamping action, uniform for every tie, with the tamping effect extending beneath the ties and beneath the rails.

I claim:

1. In a ballast tamping machine, a base movable along rails of a track, a drophead on the base mounted for vertical reciprocation thereon, said drophead being mounted for limited longitudinal and vertical movement during reciprocation thereof, a plurality of ballast working implements carried by the drophead and movable into the ballast supporting the track during downward movement of the drophead, means on the drophead for imparting vibration to the drophead and to the ballast working implement, flexible means on the base connected to the drophead for raising and lowering said drophead, a plurality of upstanding guides on the base for guiding the drophead during its vertical reciprocation, and resilient means between the drophead and the guides mounted on one and engageable with the other to guide the drophead in the guides and to provide limited longitudinal movement of the drophead with respect to the guides during reciprocation thereof.

2. The structure of claim 1 wherein said last-named resilient means includes a plurality of leaf spring elements carried by said drophead and received within and engaged with said guides.

3. The structure of claim 1 wherein said first-named resilient means includes a compression spring interposed between and engaging a portion of said drophead and a member carried by said flexible means.

4. In a tie tamper, a base and means movably supporting it above a tie to be tamped, a drophead movable on the base, means on said base connected to said drophead for raising and lowering said drophead, and means on the base for guiding said drophead for movement along a generally upright path in relation to the base, material engaging elements mounted on and movable with the drophead, means on the drophead for imparting vibration to the drophead and to the material-engaging elements, said drophead guiding means including an upstanding track on the tie tamper base and a spring assembly mounted on the drophead between the drophead and the track in engagement with the track to guide the drophead in the guiding means and to provide limited longitudinal movement of the drophead with respect to the guiding means during vertical movement thereof, said spring assembly having a lower arm in engagement with the guide track and an upper arm spaced from the lower arm in engagement with the guide track, said upper and lower arms having adjacent ends connected to the drophead, and means on the drophead engaging the upper arm providing a bias therefor in an outward direction with respect to its point of connection to the drophead.

5. The structure of claim 4 wherein said lower arm comprises a leaf spring.

6. The structure of claim 4 wherein said upper arm comprises a lever pivotally connected to said drophead, and said last mentioned means comprises a compression spring engaging said drophead and said arm for biasing the upper end of said arm outwardly.

7. The structure of claim 1 further characterized by and including resilient means connecting the flexible means and the drophead for reducing the transmission of vibrations from the drophead to the flexible means.

8. The structure of claim 1 further characterized in that the means for vibrating the drophead includes means for orbitally vibrating said drophead.

9. The structure of claim 1 further characterized in that the ballast working implements have offset portions at their lower ends adapted to engage the ballast when the drophead is dropped, the implements being disposed in pairs with the offset portions of the implements of such a pair extending toward each other, the implements also being grouped with the offset portions of the implements of one group extending toward the offset portions of the implements of an adjacent group.

10. The structure of claim 1 further characterized in that said resilient means between the drophead and guides includes a lower arm comprising a curvilinear spring in engagement with the guides.

11. The structure of claim 1 further characterized in that said resilient means between the drophead and guides includes a lower arm in engagement with the guides and an upper arm spaced from the lower arm in engagement with the guides, said upper and lower arms having adjacent ends connected to the drophead, and means on the drophead engaging the upper arm providing a bias therefor in an outward direction with respect to its point of connection to the drophead.

12. A drophead assembly for use with a ballast tamping unit, said assembly including a supporting drophead constructed to be moved freely in a vertical direction within the guides of the tamping unit and a plurality of unitary ballast working implements freely pivoted on the undersides of the drophead for otherwise free pivotal movement in relation to the drophead, the implements being pivoted about generally lateral horizontal axes and disposed in opposed laterally aligned groups, and spring means engaging the drophead and implements for individually rotating each of the implements about its pivot in a longitudinally outward direction, the lower end of each implement being offset inwardly so that upon striking the ballast when the drophead is dropped, each implement will rotate longitudinally inwardly against its spring means.

13. The structure of claim 12 further characterized in that each ballast working implement includes a generally cylindrical hub penetrated from end to end by an axial bore which functions as its pivot, a metallic shank unitary with the hub, and extending generally rectilinearly downwardly from the hub, intermediate the ends of the hub and generally perpendicular to the axis of the hub, the lower end of the implement being a spadelike portion inclined in relation to the shank, and an integral actuating lever extending outwardly from the side of the hub opposite to the side from which the shank extends.

References Cited in the file of this patent

UNITED STATES PATENTS

| | | |
|---|---|---|
| 191,164 | Mead | May 22, 1877 |
| 354,698 | Gleason | Dec. 21, 1886 |
| 376,565 | Waldron et al. | Jan. 17, 1888 |
| 504,063 | Evans | Aug. 29, 1893 |
| 895,387 | Mercer | Aug. 4, 1908 |
| 1,530,181 | Jackson | Mar. 17, 1925 |
| 1,552,611 | Jackson | Sept. 8, 1925 |
| 1,980,704 | Scheuchzer | Nov. 13, 1934 |
| 2,043,585 | Kerwin | June 9, 1936 |
| 2,082,594 | Philbrick | June 1, 1937 |
| 2,467,511 | Van Fleet | Apr. 19, 1949 |
| 2,678,477 | Russel | May 18, 1954 |
| 2,712,287 | Zurmuhle | July 5, 1955 |
| 2,725,603 | Curtze | Dec. 6, 1955 |
| 2,734,463 | Hursh et al. | Feb. 14, 1956 |

FOREIGN PATENTS

| | | |
|---|---|---|
| 392,107 | France | Sept. 16, 1908 |
| 478,243 | Great Britain | Jan. 10, 1938 |
| 703,011 | Great Britain | Jan. 27, 1954 |